Patented Mar. 5, 1940

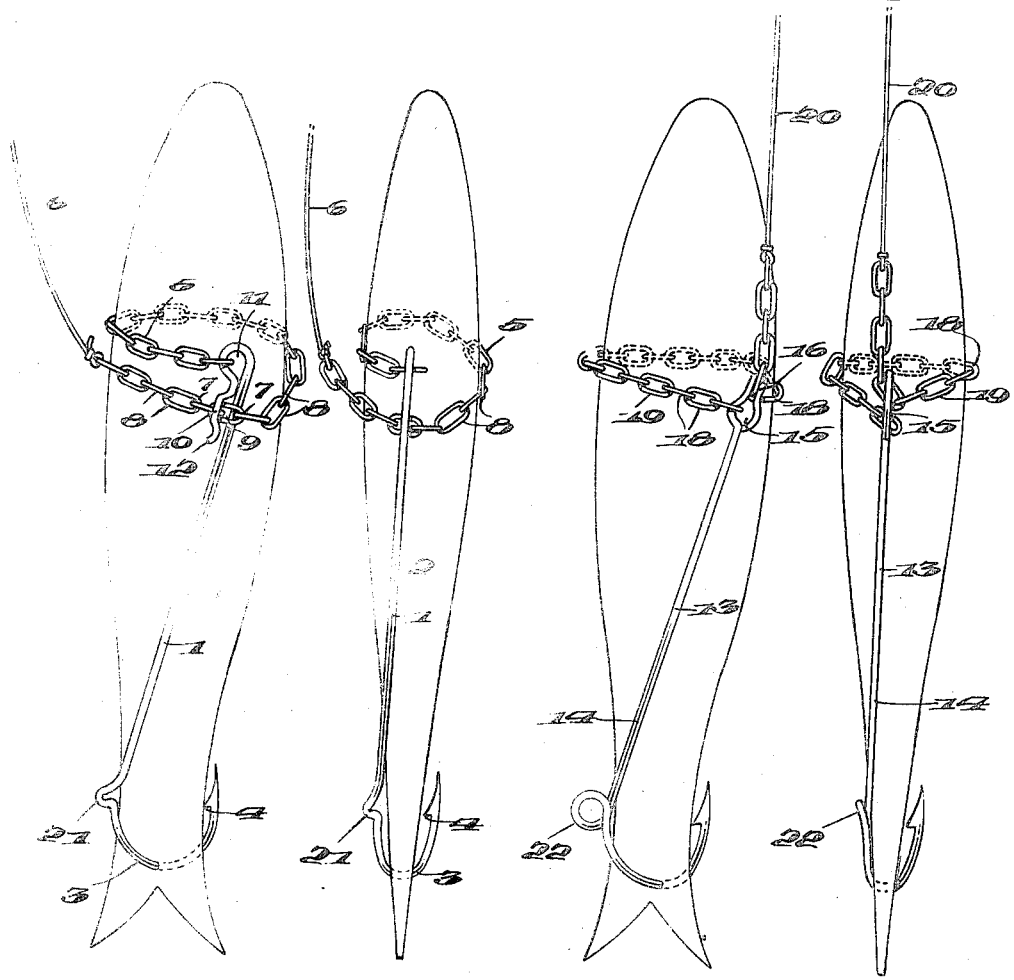

2,192,800

UNITED STATES PATENT OFFICE 2,192,800

FISHHOOK

Walter S. Peterson, Denver, Colo.

Application July 12, 1939, Serial No. 284,120

7 Claims. (Cl. 43—40)

My invention relates to fishhooks of the type which is especially suitable for live bait and its principal object is to provide the hook with simple and reliable means for firmly attaching the bait to the hook.

A principal feature of the invention consists in providing the hook with a flexible member which is adapted to be secured to a fishing line and to encircle the bait in spaced relation to the barb of the hook, the shank of the hook being provided with means for selectively engaging abutments on the flexible member so as to detachably connect an intermediate portion of the member to the hook and thus provide the member with an adjustable loop for encircling the bait which will not be subjected to tension by the fishing line.

Another feature of the invention consists in providing the hook with a chain which is adapted to encircle the bait in spaced relation to the barb of the hook and is secured to a fishing line, the shank of the hook being provided with means for selectively interlocking with individual links of the chain to thereby provide the chain with an adjustable loop for encircling the bait.

Other and more specific features of the invention, residing in advantageous forms, combinations and relations of parts, will hereinafter appear and be pointed out in the claims.

In the drawing:

Figure 1 is an elevational view of a fishhook embodying the preferred form of my invention, one form of bait being shown as applied to the hook.

Figure 2 is a view taken at substantially right angles to Figure 1.

Figure 3 is a view corresponding to Figure 1 illustrating another embodiment of the invention.

Figure 4 is a view corresponding to Figure 2 illustrating the embodiment of the invention shown in Figure 3.

Figure 5 is a detail sectional view showing the manner in which the chain is adapted to be interlocked with means provided on the shank of the hook.

Figure 6 is a detail view of the upper portion of the hook illustrated in Figures 3 and 4.

Referring more particularly to the drawing and especially to Figures 1 and 2 thereof, I indicates the fishhook as a whole which has a shank 2, a curved portion 3 and a barb 4.

To firmly secure most live bait to a fishhook, it is necessary to connect the bait to the lower portion of the hook as well as to the shank thereof. While no special problem exists in connecting the bait to the lower portion of the hook, since it may be easily impaled thereon, considerable difficulty has been experienced in connecting the bait to the shank of the hook. In some cases, the fishing line has been looped around the bait to connect it to the shank but this has proved unsatisfactory because a pull on the fishing line may subject the loop to such tension as to either cut the bait in two or kill it.

The means I have devised for securing the bait to the shank of the hook is not subject to the objections of prior devices and comprises a flexible member 5 which is adapted to encircle the bait and is connected at one end to the shank of the hook and at the other end to the fishing line 6 or to a snell secured to the line. The flexible member is provided with a plurality of spaced portions affording shoulders or abutments and, since the ends 7 of each of the links 8 of a conventional chain provide abutments of a character suitable for the intended purpose, the flexible member may advantageously be in the form of a chain as illustrateed in the drawing.

To provide the chain with an adjustable loop for encircling bait of varying size, the shank of the hook is provided with means for selectively interlocking with individual links of the chain. In the form of the invention illustrated in Figures 1 and 2, this means constitutes two laterally spaced portions 9 and 10 respectively, the portion 9 being a part of the shank of the hook and the portion 10 constituting a part of an extension of the shank which is bent upon itself and may be so shaped as to provide an eye 11 to which the chain may be conveniently connected. Portion 10 preferably extends longitudinally of the shank of the hook and it may conveniently terminate in an outwardly curved prolongation 12 so that a selected link of the chain may be easily interposed between portions 9 and 10. The space between the portions 9 and 10 is somewhat greater than the thickness of the stock from which the links are formed but is less than the width of the links so that the adjacent ends of the two links which are connected to the link inserted in the space between portions 9 and 10 will abut against those portions upon longitudinal movement of the latter link and thereby prevent any substantial diminution or enlargement of the loop portion of the chain. Thus by providing the flexible member 5 with abutments which are selectively adapted to be engaged by the laterally spaced portions 9 and 10, the member may be formed with an adjustable loop to accommodate varying sizes of bait and yet the loop will not be subjected to any tension whatsoever by the fishing line.

In the form of the invention illustrated in Figures 3 and 4, the shank 13 of the hook 14 is formed with an eye 15 having a restricted portion 16 formed by laterally spaced portions 17 for selectively interlocking with individual links 18 of chain 19 which is connected at one end to the eye 15 of the hook and at its other end to the fishing line 20 or to a snell connected to the line. The chain is threaded through the eye 15 and individual links thereof are adapted to be selectively interlocked with the laterally spaced portions 17 in substantially the same manner as the links of the chain shown in Figure 1 are adapted to interlock with the laterally spaced portions 9 and 10 thereof so as to provide an adjustable loop adapted to encircle the bait and which will not be subjected to tension by the fishing line.

To prevent the end of the bait which is impaled on the lower portion of the hook from riding up the shank, the lower portion of the latter is preferably provided with an offset portion or projection. In the form of the invention illustrated in Figures 1 and 2, the projection for preventing the bait from riding up the shank of the hook is designated by the numeral 21 and is formed by crimping the shank preferably adjacent the point where it joins the curved portion 3 of the hook. In the form of the invention illustrated in Figures 3 and 4, the means for preventing the bait from riding up the shank of the hook is designated by the numeral 22 and is formed by providing the lower portion of the shank with a loop or eye.

While the bait illustrated in the drawing is diagrammatically representative of a live fish or minnow, it will, of course, be apparent that other bait such as frogs, salted minnows, mice, etc., may be secured to the hook by impaling one portion thereof on the barb and encircling another portion thereof by the chain in substantially the same manner as shown in the drawing.

It will also be appreciated that my invention is susceptible to many modifications without departing from the spirit and scope thereof as defined in the appended claims.

What I claim is:

1. The improvement in fishhooks of the type having a shank terminating in a curved portion and provided with a barb and in which a live bait is adapted to be connected to the hook by being impaled on said barb, said improvement consisting of a flexible member adapted to encircle the bait in spaced relation to the barb and having a plurality of spaced portions affording abutments, one end of said member being secured to the shank of the hook and the other end thereof being adapted to be secured to a fishing line, and means on said shank for selectively engaging said abutments to detachably connect an intermediate portion of said member to the hook and thus provide the member with an adjustable loop for encircling the bait, said means when in engagement with any one of said abutments serving to prevent said loop from being subjected to tension by the fishing line.

2. The improvement in fishhooks of the type having a shank terminating in a curved portion and provided with a barb and in which a live bait is adapted to be connected to the hook by being impaled on said barb, said improvement consisting of a chain adapted to encircle the bait in spaced relation to said barb, one end of said chain being secured to the shank of the hook and its other end being adapted to be connected to a fishing line, and means on said shank for selectively interlocking with individual links of the chain to thereby provide the chain with an adjustable loop for encircling the bait, said means when interlocked with said chain serving to prevent said loop from being subjected to tension by the fishing line.

3. The improvement in fishhooks of the type having a shank terminating in a curved portion and provided with a barb and in which a live bait is adapted to be connected to the hook by being impaled on said barb, said improvement consisting of a flexible member adapted to encircle the bait in spaced relation to the barb, one end of said member being secured to the shank of the hook and its other end being adapted to be connected to a fishing line, and means mounted on said shank providing laterally spaced portions for receiving said member, said member having a plurality of abutments spaced longitudinally thereof adapted to be selectively engaged by said laterally spaced portions to detachably connect an intermediate portion of the member to the hook and thereby provide the member with an adjustable loop for encircling the bait, said means when in engagement with any one of said abutments serving to prevent said loop from being subjected to tension by the fishing line.

4. The improvement in fishhooks of the type having a shank terminating in a curved portion and provided with a barb and in which a live bait is adapted to be connected to the hook by being impaled on said barb, said improvement consisting of a chain adapted to encircle the bait in spaced relation to said barb, one end of said chain being secured to the shank of the hook and the other end thereof being adapted to be secured to a fishing line, and a member extending longitudinally of the shank and forming therewith means for selectively interlocking with individual links of the chain to thereby provide the chain with an adjustable loop for encircling the bait, said means when interlocked with the chain serving to prevent said loop from being subjected to tension by the fishing line.

5. The improvement in fishhooks of the type having a shank terminating in a curved portion and provided with a barb and in which a live bait is adapted to be connected to the hook by being impaled on said barb, said improvement consisting of a chain adapted to encircle the bait in spaced relation to said barb, one end of said chain being secured to the shank of the hook and its other end being adapted to be connected to a fishing line, and a member formed integrally with the shank providing an eye for receiving the end of the chain connected to the hook and also providing means for detachably and selectively connecting intermediate links of the chain to the hook so as to provide the chain with an adjustable loop for encircling the bait, said means when connected to a selected intermediate link of the chain serving to prevent said loop from being subjected to tension by the fishing line.

6. The improvement in fishhooks of the type having a shank terminating in a curved portion and provided with a barb and in which a live bait is adapted to be connected to the hook by being impaled on said barb, said improvement consisting of a chain adapted to encircle the bait in spaced relation to said barb, one end of said chain being secured to the shank of the hook and its other end being adapted to be connected to a fishing line, and an eye formed integrally with the upper portion of the shank through which said chain is adapted to be threaded, said eye having a restricted portion for selectively interlocking with individual links of the chain intermediate the ends thereof to provide the chain with an adjustable loop for encircling the bait, said restricted portion of the eye when interlocked with the chain serving to prevent said loop from being subjected to tension by the fishing line.

7. The improvement in fishhooks of the type having a shank terminating in a curved portion and provided with a barb and in which a live bait is adapted to be connected to the hook by being impaled on said barb, said improvement consisting of a flexible member adapted to encircle the bait in spaced relation to the barb, one end of said member being secured to the shank of the hook and its other end adapted to be connected to a fishing line, a bend formed in the lower portion of the shank to provide an offset portion preventing the portion of the bait impaled on the barb from riding up the shank, and means mounted adjacent the upper end of the shank affording laterally spaced portions for receiving said flexible member, said member having a plurality of abutments spaced longitudinally thereof adapted to be selectively engaged by said laterally spaced portions to detachably connect an intermediate portion of the member to the hook and thereby provide the member with an adjustable loop for encircling the bait.

WALTER S. PETERSON.